UNITED STATES PATENT OFFICE.

MOSES W. PAGE, OF FRANKLIN, NEW HAMPSHIRE.

IMPROVED PROCESS OF TANNING.

Specification forming part of Letters Patent No. 54,588, dated May 8, 1866.

*To all whom it may concern:*

Be it known that I, MOSES W. PAGE, of Franklin, in the county of Merrimack and State of New Hampshire, have invented an Improved Process of Tanning Leather; and I do hereby declare that the following is a full, clear, and exact description of the same.

My invention consists in an improved process of tanning leather, whereby the fibers are closely united or condensed and caused to lie compactly together, thus greatly increasing the strength and toughness of the leather, while at the same time it is rendered pliable, which process adapts it particularly for lace, leather, and for other purposes where great strength and toughness combined with pliability are required.

To enable others skilled in the art to understand and use my invention, I will proceed to describe the manner in which I have carried it out.

The hides to be tanned are first worked and softened in the usual manner, when they are placed in a weak solution of lime for one or two days, after which they are placed in a strong solution of lime and limed light. When well limed they are unhaired and drenched quickly and thoroughly in a solution of hen-manure, or other suitable preparation, so as to entirely remove all the lime. They are then immersed in a coloring liquid made from equal parts of any suitable bark and sweet fern, cutch and sweet fern, or gambier and sweet fern, where they remain from three to six days, during which time they are frequently handled, first in weak and afterward in strong liquor. They are then removed and thoroughly worked both on the flesh and grain sides, after which they are treated in the following manner: I take forty parts or pounds of common salt, (chloride of sodium,) or an equivalent of chloride of potassium, ammonia, or other chloride soluble in water; forty parts or pounds of alum, (either potash, soda, or ammonia alum, or sulphate of alumina,) or an equivalent of a soluble aluminous salt, and thirteen and thirty-three one-hundredth parts or pounds of saltpeter or an equivalent of soda, or ammonia saltpeter, or soluble nitrate of the earths, and mix them thoroughly. I dissolve this mixture in four vats, which measure about six feet by four feet, and four feet deep, half-filled with water, using for vats Nos. 1 and 2 two-thirds the weight of the mixture necessary to make the liquor in vats Nos. 3 and 4 saturated. Thus, if vats Nos. 3 and 4 require three hundred pounds for producing saturation, I place two hundred pounds only in vats Nos. 1 and 2. This forms my salt solution. I then dip from vat No. 4 two gallons of salt solution into a tub, and add to it two quarts of oil of vitriol, two gallons of muriate of tin of 140° to 150° T. strength, or an equivalent of chrystals of tin, or any soluble salt of protoxide of tin, two gallons of muriatic acid of 20° to 23° B. strength, and two gallons of nitric acid of 36° or 40° B. strength. I prefer to form my tin solution in this way; but I can use, instead of muriatic acid, nitric acid, and muriate of tin, six gallons of oxymuriate of tin, 120° T. strength, or eight gallons of a hot solution of pink salt, (double chloride of tin and ammonia,) the mixture being made by stirring at the time of each addition. The liquor may then be transferred to a carboy and preserved as my tin solution. I then take one pint of this tin solution and put it into each of the vats Nos. 3 and 4, containing the salt solution first described, thus making the mixture in these latter vats of a greater strength, as required, each of the four vats being capable of immersing about one hundred sides of leather or one hundred and fifty calf-skins, and one pint of this tin solution is put into each of the vats Nos. 3 and 4 every time a new lot of hides is placed therein. The hides are now immersed in vat No. 1, where they are allowed to remain about four hours, when they are removed and immersed in vat No. 2 for about five hours, then in vat No. 3 for about seven hours, and in vat No. 4 for about eight hours—in all about twenty-four hours. They are then removed and well worked both on the flesh and grain sides, after which they are curried and finished.

The above-described process of tanning leather condenses it and causes the fibers to be brought compactly together, thus greatly increasing its strength and toughness, while at the same time it is rendered soft and pliable when finished, thus particularly adapting it for lace leather, picker or harness straps for looms, or for extremely thin and narrow machine-belting. This process, however, is also well adapted for tanning calf, wax, belting, harness, or any other variety of leather that may be desired.

I do not limit myself to the exact proportions or to the precise time which the hides are immersed in the various solutions, as they may be varied somewhat to suit different kinds or grades of leather without departing from the spirit of my invention. In practice, however, I have found the proportions and time above spoken of to answer well.

In the coloring process first described the sweet fern may be entirely dispensed with, if preferred, and a coloring liquor made either of bark, cutch, gambier, or other suitable tanning material be employed instead, or the sweet fern may be employed alone, if desired; but the liquor first described I consider to be the best.

What I claim as my invention, and desire to secure by Letters Patent, is—

The within described process of tanning leather, substantially as set forth.

MOSES W. PAGE.

Witnesses:
 P. E. TESCHEMACHER,
 N. W. STEARNS.